(12) United States Patent
Park et al.

(10) Patent No.: US 9,363,122 B2
(45) Date of Patent: Jun. 7, 2016

(54) METHOD AND APPARATUS FOR TRANSMITTING TRAINING FIELD

(71) Applicant: LG ELECTRONICS INC., Seoul (KR)

(72) Inventors: Jong Hyun Park, Anyang-si (KR); Hyang Sun You, Anyang-si (KR); Yong Ho Seok, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 34 days.

(21) Appl. No.: 14/359,731

(22) PCT Filed: Nov. 28, 2012

(86) PCT No.: PCT/KR2012/010146
§ 371 (c)(1),
(2) Date: May 21, 2014

(87) PCT Pub. No.: WO2013/081364
PCT Pub. Date: Jun. 6, 2013

(65) Prior Publication Data
US 2014/0328430 A1 Nov. 6, 2014

Related U.S. Application Data

(60) Provisional application No. 61/564,265, filed on Nov. 28, 2011, provisional application No. 61/564,866, filed on Nov. 30, 2011, provisional application No. 61/566,005, filed on Dec. 2, 2011.

(51) Int. Cl.
*H04L 5/14* (2006.01)
*H04L 27/26* (2006.01)
*H04L 25/02* (2006.01)
*H04L 1/00* (2006.01)
*H04L 5/00* (2006.01)

(52) U.S. Cl.
CPC .......... *H04L 27/2607* (2013.01); *H04L 1/0042* (2013.01); *H04L 1/0075* (2013.01); *H04L 25/0224* (2013.01); *H04L 27/2613* (2013.01); *H04L 5/0048* (2013.01)

(58) Field of Classification Search
CPC .................................................. H04L 27/2607
USPC .................. 370/311, 328–339, 474; 375/295
See application file for complete search history.

(56) References Cited

U.S. PATENT DOCUMENTS 8,571,010 B1 * 10/2013 Zhang ............... H04W 56/0005
370/230
2011/0149927 A1 6/2011 Stacey et al.
(Continued)

FOREIGN PATENT DOCUMENTS

KR 10-2007-0020505 2/2007
KR 10-2011-0082685 7/2011
(Continued)

OTHER PUBLICATIONS

Vermani, "Preamble Format for 1 MHz," doc.: IEEE 802.11-11/1482r2, Nov. 2011, 30 pages.
(Continued)

*Primary Examiner* — Iqbal Zaidi
(74) *Attorney, Agent, or Firm* — Lee, Hong, Degerman, Kang & Waimey; Jonathan Kang; Richard Salfelder

(57) ABSTRACT

Disclosed are a method and apparatus for transmitting a training field. The method for transmitting a training field in a wireless LAN system comprises the steps of: transmitting additional long training field (LTF) indication information; and transmitting a frame including the additional LTF and partitioned data fields. The additional LTF comprises a field for demodulating the partitioned data fields included in the frame, the additional LTF indication information includes information on the location of the additional LTF included in the frame, and the partitioned data field includes at least one sub-field. Accordingly, the present invention can enhance channel estimation performance.

10 Claims, 15 Drawing Sheets

(56) References Cited

U.S. PATENT DOCUMENTS

2013/0128807 A1* 5/2013 Vermani ............... H04L 5/0053
370/328
2014/0079016 A1* 3/2014 Dai ....................... H04L 5/0041
370/330

FOREIGN PATENT DOCUMENTS

| KR | 10-2011-0093559 | 8/2011 |
|----|-----------------|--------|
| WO | 2011/093668 | 8/2011 |

OTHER PUBLICATIONS

Bo, et al., "11ah PLCP Preamble Design," doc.: IEEE 802.11-11/1502r2, Nov. 2011, 9 pages.
Korean Intellectual Property Office Application Serial No. 10-2014-7017964, Office Action dated Mar. 26, 2015, 5 pages.
Vermani, et al., "Preamble format for 1MHz", IEEE 802.11-11/1482r2, Nov. 2011, 30 pages.

* cited by examiner

FIG. 12
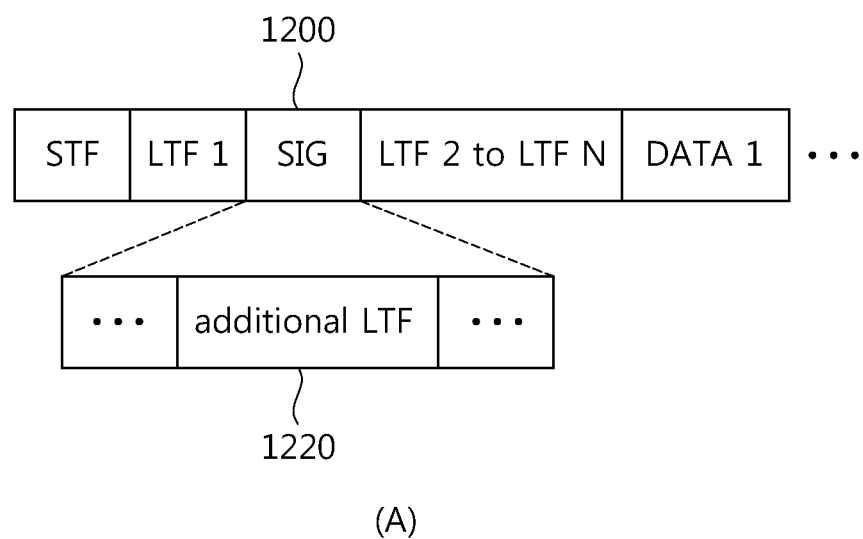
(A)
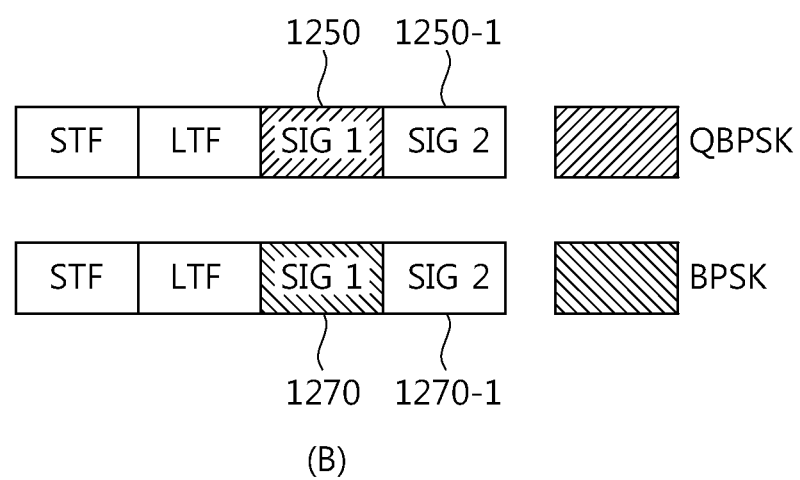
(B)

FIG. 14
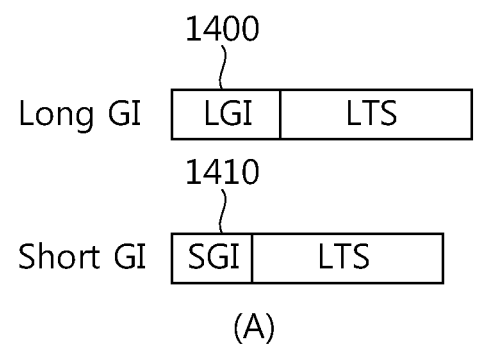
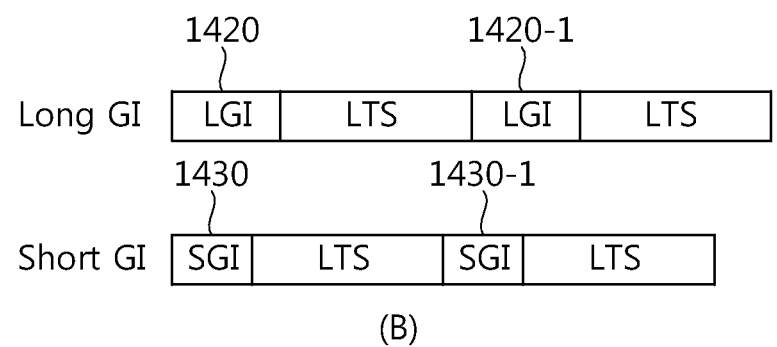
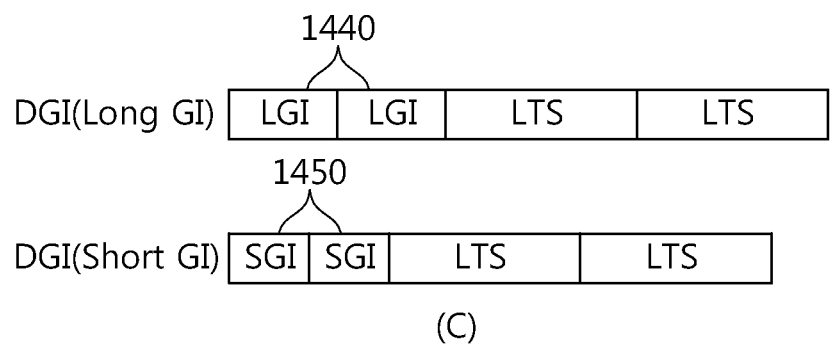

METHOD AND APPARATUS FOR TRANSMITTING TRAINING FIELD

CROSS-REFERENCE TO RELATED APPLICATIONS

This application is the National Stage filing under 35 U.S.C. 371 of International Application No. PCT/KR2012/010146, filed on Nov. 28, 2012, which claims the benefit of U.S. Provisional Application Ser. No. 61/564,265, filed on Nov. 28, 2011, 61/564,866, filed on Nov. 30, 2011, and 61/566,005, filed on Dec. 2, 2011, the contents of which are all hereby incorporated by reference herein in their entirety.

BACKGROUND OF THE INVENTION

1. Field of the Invention

The present specification relates to a wireless communication, more particularly, to a method and an apparatus for transmitting a training field which is designed to demodulating a data field.

2. Related Art

Recently, Machine-to-Machine (M2M) system is spotlighted as the next generation communication technology, and new standard for it has been in the course of establishment in order to technically support it in IEEE 802.11 WLAN. The M2M system means the network in which machinery, as a main agent of communication, not human exchanges information. The components of M2M are widely ranged from sensors to detect temperature and humidity, electric home appliance such as camera, TV and etc. to large-scale machines such as machinery tools and automobiles. Recently, with emerging various communication services such as smart grid, eHealth and ubiquitous, M2M technology is widely used in order to technically support the communication services. The characteristics of M2M system are as follows.

1) Large number of station: As for M2M, large number of station is assumed that is different from the existing network. That is because sensors installed on house, company, and etc as well as machines of personal belongings should be considered. Accordingly, considerably large number of station may be connected to a single AP.

2) Low traffic load per each station: Because M2M terminal has traffic pattern which is collecting and reporting information around, it is not necessary to communicate data frequently but also the amount of data is not considerable.

3) Uplink centric: M2M has structure that reports the data using uplink after receiving commands and executing procedures. Since main data is commonly forwarded using uplink, consequently, uplink is mainly used in M2M.

4) Long durability of Station: M2M terminals are operated by mainly battery, and user frequently recharges the battery in many cases. Accordingly, long durability is demanded by minimizing consumption of the battery.

5) Automatic recovery function: M2M terminals are not operable by users in certain situation. Accordingly, automatic recovery function is necessary.

SUMMARY OF THE INVENTION

An object of the present invention is to provide a method of transmitting a training field.

Further, an object of the present specification is to provide an apparatus which can perform the method of transmitting a training field.

According to an aspect of the present invention, a method for transmitting a training field in a wireless LAN system may comprise transmitting an additional long training field (LTF) indication information, and transmitting a frame including the additional LTF and a segmented data field, wherein the additional LTF includes the field which is configured to demodulate the segmented data field which is included in the frame, wherein the additional LTF indication information includes the location information of the additional LTF which is included in the frame, and wherein the segmented data field includes at least one sub field. According to the method for transmitting a training field, the additional LTF indication information may be included in the at least one sub field, and the additional LTF may be a field following the segmented data field. The method for transmitting a training field may further comprise transmitting a SIG field of the frame with the information of whether the additional LTF is transmitted being included, wherein the information of whether the additional LTF is transmitted may be the information that indicates whether the additional LTF is transmitted with being included in the frame, and wherein the information indicates whether the additional LTF is transmitted with being included in the frame based on a modulating method of the SIG field or whether the additional LTF may be transmitted with being included in the frame while included in the sub field information which is included in the SIG field. The additional LTF indication information may be the information of the number of the additional LTF included in the frame. The additional LTF indication information is the information indicating at which place the additional LTF may be transmitted in the line of OFDM symbols. Transmitting the additional LTF indication information may include generating the management frame with the additional LTF indication information being included, and transmitting the management frame. The method for transmitting a training field may further comprise transmitting a first pilot signal for the segmented data field, and transmitting a second pilot signal for the additional LTF having a different phase rotation from the first pilot signal. The additional LTF may be a field generated by selecting one guard interval among a long guard interval (LGI), a short guard interval (SGI) and a double guard interval with cyclic prefix according to a modulation and coding scheme (MCS) index of the frame. The method for transmitting a training field may further comprise transmitting the segmented data field with each SIG field being included.

According to another aspect of the present invention, a user equipment that transmit a training field in a wireless LAN system may comprise a processor implemented to transmit an additional long training field (LTF) indication information and to transmit a frame including the additional LTF and a segmented data field, wherein the additional LTF includes a field for demodulating the segmented data frame, wherein the additional LTF indication information includes the information of the additional LTF location which is included in the frame, and wherein the segmented data field includes at least one sub field. The additional LTF indication information may be included in one sub field at least, and wherein the additional LTF is following the segmented data field. The processor may be implemented to transmit a SIG field of the frame with the information of whether the additional LTF is transmitted being included, and the information of whether the additional LTF is transmitted may be the information indicating whether the additional LTF is transmitted with being included in the frame, and the information indicates whether the additional LTF is transmitted with being included in the frame based on a modulating method of the SIG field or whether the additional LTF is transmitted with being included in the frame while included in the sub field information which is included in the SIG field. The additional LTF indication information may be the information of the number of the additional LTF included in the frame. The additional LTF indication information may be the information indicating at which place the additional LTF is transmitted in the line of OFDM symbols. The process may be implemented to generate the management frame with the additional LTF indication information being included in order to transmit the management frame. The process may be implemented to transmit a first pilot signal for the segmented data field and to transmit a second pilot signal for the additional LTF having a different phase rotation from the first pilot signal. The additional LTF may be a field generated by selecting one guard interval among a long guard interval (LGI), a short guard interval (SGI) and a double guard interval with cyclic prefix according to a modulation and coding scheme (MCS) index of the frame. The processor may be implemented to transmit the segmented data field with each SIG field being included.

According to the method and apparatus for transmitting a training field according to an embodiment of the present invention as described above, a data field of a frame is multiply divided and the divided data field can be demodulated by using a training field which is additionally transmitted. Accordingly, in case that a channel environment fluctuates, the divided data field can be demodulated by accurately performing channel estimation based on the training field which is added. Consequently, the performance of channel estimation for the data field can be improved.

BRIEF DESCRIPTION OF THE DRAWINGS

FIG. 12 is a schematic view illustrating the method of indicating whether the LTF is additionally included in the data field according to an embodiment of the present invention.

FIG. 14 is a schematic view illustrating the LTF according to an embodiment of the present invention.

DESCRIPTION OF EXEMPLARY EMBODIMENTS

Figure 1:
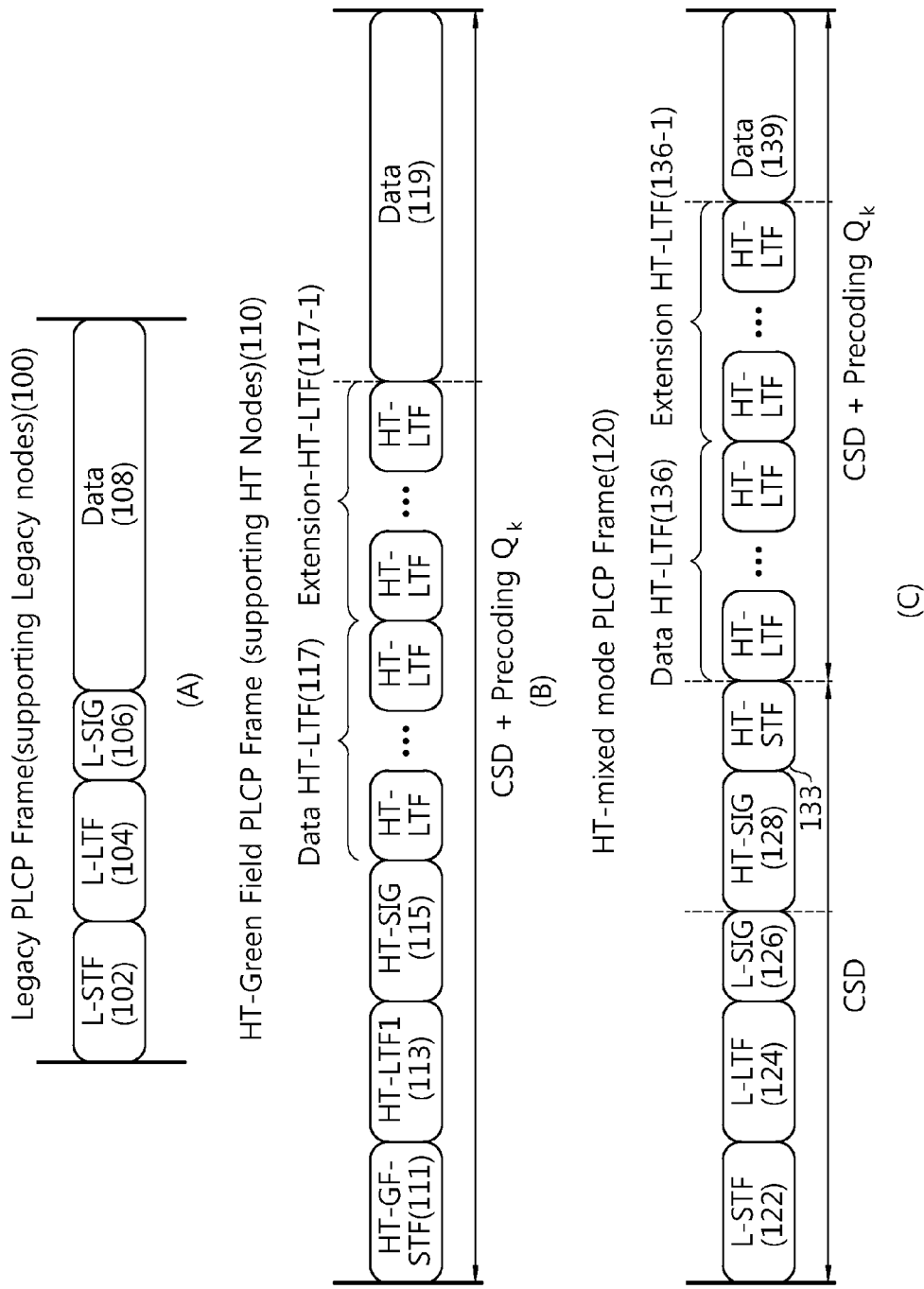
FIG. 1 is a schematic view illustrating the frame format of physical layer convergence procedure protocol data unit (PPDU) which is defined in the existing IEEE 802.11 standard.

FIG. 1 is a schematic view illustrating the frame format of physical layer convergence procedure protocol data unit (PPDU) which is defined in the existing IEEE 802.11 standard.

FIG. 1(A) is a schematic view illustrating the legacy PLCP frame which has been used in IEEE 802.11a, IEEE 802.11b and IEEE 802.11g.

Referring to FIG. 1(A), the legacy PLCP frame 100 includes a Legacy Short Training Field (L-STF) 102, a Legacy Long Training Field (L-LTE) 104, a Legacy Signal (L-SIG) 106 and Data 108.

The L-STF 102 is used for the frame timing acquisition and the automatic gain control convergence, and the L-LTF 104 is used for the channel estimation for demodulating the L-SIG 106 and the Data 108. In the L-SIG 106, the information is included for demodulating and decoding the Data 108 which is transmitted later.

IEEE 802.11n high throughput system (hereinafter, HT system), the standard which is developed later is designed to also support the legacy PLCP format as well which has been used in IEEE 802.11a, IEEE 802.11b and IEEE 802.11g. In IEEE 802.11n, the following two formats are distinguished to be defined: the one is the frame format that can be used in the system where only high throughput station (HT STA) exists and the other is the frame format that can be used in case that the legacy STA which has been used in the existing IEEE 802.11a, IEEE 802.11b and IEEE 802.11g and the HT STA which is newly defined in 802.11n coexist.

FIG. 1(B) is a schematic view illustrating the HT-Green field PLCP frame 110.

Referring to FIG. 1(B), in IEEE 802.11n, the system made up of the only HT STAs is defined, and the PLCP frame format which can be effectively used in the system made up of the only HT STAs is newly defined. The PLCP frame format is defined as the title of the HT-Green Field PLCP format 110.

The HT-Green Field PLCP frame 110 includes a HT-Green Field Short Training Field (HT-GF STF) 111, a HT Long Training Field (HT-LTF) 113, a HT Signal (HT-SIG) 115, an additional HT-LTF 117 and 117-1 and Data 119. The HT-GF STF 111 is used for the frame timing acquisition and the automatic gain control convergence. The HT-LTF 113 is used for the channel estimation and the like for demodulating the HT-SIG 115 and the Data 119. The HT-SIG 115 includes the information for demodulation and decoding the Data which is transmitted after the HT-SIG 115. The additional HT-LTF 117 and 117-1 may be additionally included in the frame format in case that the multiple input multiple output (MIMO) is used.

In case that the Data is transmitted by MIMO to multiple STAs, the additional HT-LTF 117 and 117-1 may include the channel estimation information for each STA.

FIG. 1(C) is a schematic view illustrating the HT-mixed Mode PLCP Frame 120.

Referring to FIG. 1(C), in IEEE 802.11n, the PLCP frame is supported, which is designed for supporting the high throughput (HT) mode in the system where the legacy STA and the HT STA coexist. The frame format is referred to the HT-mixed mode PLCP frame 120. In the HT-mixed mode PLCP frame 120, in order to support the frame format which the legacy STA can understand, L-STF 122, L-LTF 124 and L-SIG 126 are transmitted first. Afterward, the HT signal (HT-SIG) 128 is transmitted, which transmits the information required for demodulating and decoding of the data which is transmitted for the HT. By transmitting data using the non-beamforming way that does not perform beamforming by the HT-SIG 128, various STAs including the legacy STA can receive the information. The HT-LTF 136 and the data 139 which should be transmitted after the HT-SIG 128 is transmitted through precoding. In this time, in order that the STA which receives the data frame through precoding can consider the part of which power is chargeable due to precoding, the HT short training field (HT-STF) 133 is transmitted, and the HT-LTF 136 and the data 139 are transmitted later.

Figure 2:
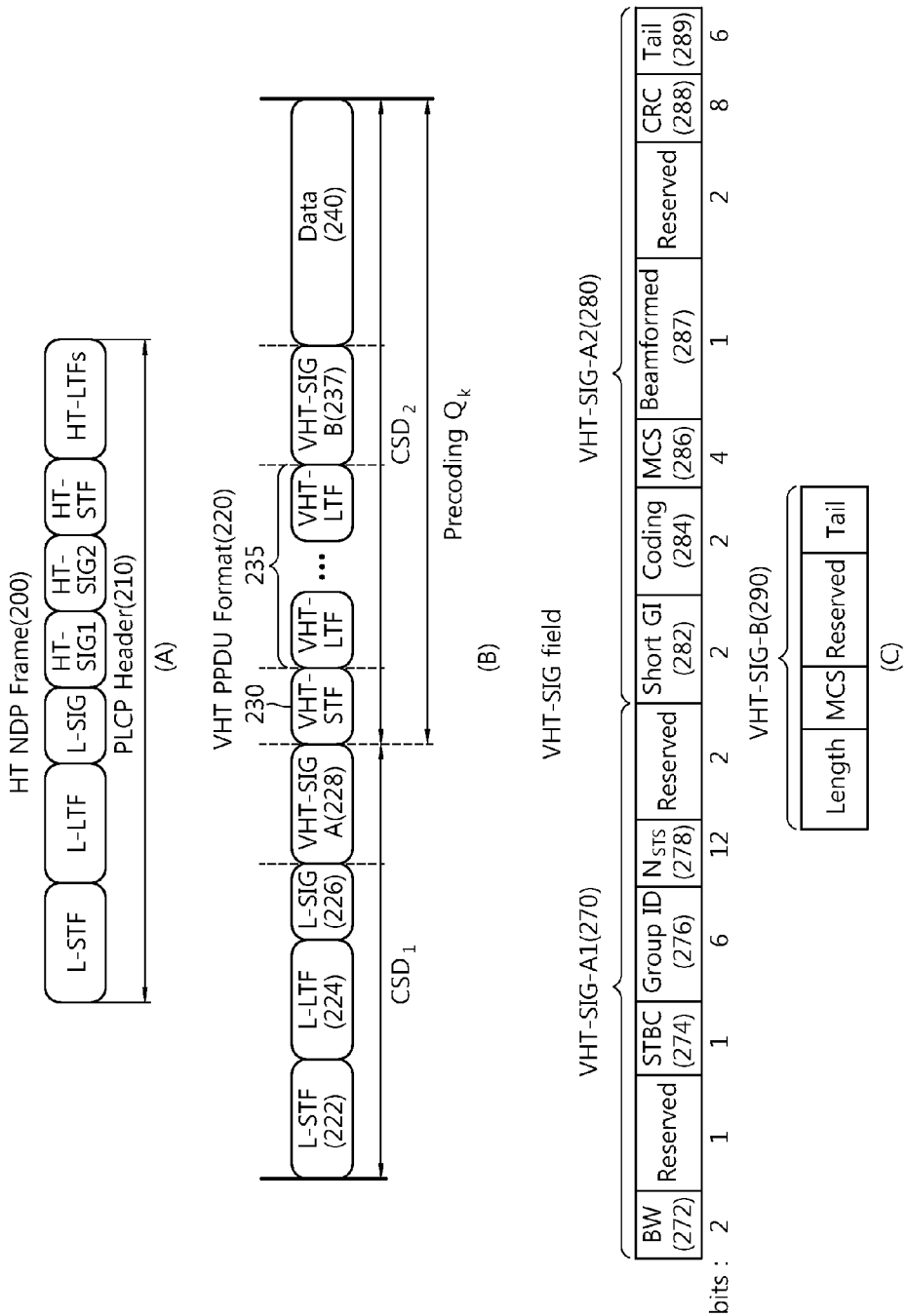
FIG. 2 is a schematic view illustrating the frame format of the physical layer convergence procedure protocol data unit (PPDU) which is defined in the existing IEEE 802.11 standard.

FIG. 2 is a schematic view illustrating the frame format of the physical layer convergence procedure protocol data unit (PPDU) which is defined in the existing IEEE 802.11 standard.

FIG. 2(A) is a schematic view illustrating the HT NDP frame 200.

Referring to FIG. 2(A), one of the biggest characteristics of the HT system is to improve the system throughput by transmitting several spatial streams using the multi antennas. In the environment where several STAs exist, it is required for beamforming toward a specific STA to which the data is going to transmit data, and accordingly, a channel sounding technique is required. IEEE 802.11n supports two channel sounding techniques. One is the regular PPDU technique which includes a data field and a MAC header, and the other is the technique of using the null data packet (NDP) which does not include a data field. In case of trying to perform channel sounding using the null data packet, the PPDU frame in which the NDP Announcement is set up should be transmitted first in order to announce the null data packet.

The NDP frame is the frame which does not have data part, and may include the PLCP header 210 only, the structure of the frame.

FIG. 2(B) is a schematic view illustrating the VHT PPDU format 220.

Referring to FIG. 2(B), in IEEE 802,11ac, the VHT PPDU frame 220 is newly defined. IEEE 802.11ac is the standard for the wireless local area network (WLAN) which supports very high throughput (VHT) in the frequency region of lower than 6 GHz. IEEE 802.11ac supports the WLAN throughput of 1 Gbps on multi-station (STA), and the maximum throughput of at least 500 Mbps in the link for one STA.

In addition, in comparison with IEEE 802.11n which supports the channel bandwidth of maximum 40 MHz, IEEE 802.11ac supports the channel bandwidths of 80 MHz and 160 MHz, and supports the non-contiguous channel bandwidth of 80+80 MHz. In comparison with IEEE 802.11n which supports the throughput of maximum 450 Mbps, and supports up to maximum 64-quadrature amplitude modulation (QAM), in order to support the high throughput of 1 Gbps, IEEE 802.11 ac supports maximum 256-QAM, and also compared with IEEE 802.11n which supports signal user-multiple input multiple output (SU-MIMO) only, IEEE 802.11a supports multiple user-MIMO.

Since IEEE 802.11ac supports MU-MIMO, STAs may have one or more antennas, and currently, IEEE 802.11ac supports the downlink MU-MIMO only where the packet is transmitted to several STAs from access point (AP). In addition, the number of STAs which are able to transmit the packet at the same time is maximum 4. When the maximum number of spatial streams which are available to support is total 8, each STA can use maximum 4 streams.

In the physical layer for supporting the VHT the MU-MIMO and the orthogonal frequency division multiplexing (OFDM) are supported. In the VHT physical layer, the continuous channel bandwidth of 20 MHz, 40 MHz, 80 MHz and 160 MHz and the discontinuous channel bandwidth of 80+80 MHz are supported. At each subcarrier of VHT physical layer, the binary phase shift keying (BPSK), the quadrature phase shift keying (QPSK), the 16-QAM, the 64QAM, and the 256-quardrature amplitude modulation (QAM) are supported, and the code rate of ½, ⅔, ¾ and ⅚ are supported through the forward error correction (FEC) which uses the convolutional code or the Low-density parity-check code (LDPC).

In order to transmit packet in the VHT environment, the PLCP service data unit (PSDU) is made, and the PLCP Protocol Data Unit (PPDU) is generated with added the Physical Layer Convergence Procedure (PLCP) preamble being attached herein. The PLCP preamble is used for assisting demodulating and transmitting the PSDU at a receiver.

The VHT PPDU format 220 includes the fields of L-STF 222, L-LTF 224, L-SIG 226, VHT-SIG-A 228, VHT-STF 230, VHT-LTFs 235 and VHT-SIG-B 237 and data field 240. While the L-STF 222, L-LTF 224 and L-SIG 226 fields are the fields that have been used in the previous WLAN before the VHT is supported, the VHT-SIG-A 228, VHT-STF 230, VHT-LTFs 235 and VHT-SIG-B 237 fields are the fields which exist in the VHT packets only.

In describing newly added fields in order to support the VHT, first, the VHT-SIG-A field 228 includes the information for describing the VHT format packet, and includes the information identically required for all STAs. The VHT-SIG-A field 228 is made up of a VHT-SIG-A1 field 270 and a VHT-SIG-A2 field 280. In the VHT-SIG A1 field 270, a bandwidth 272 of the channel which is used, whether the space time block coding (STBC) is used or not, a Group ID 276 for representing the group used for transmission by the STAs in the MU-MIMO which is grouped, the number of the stream 278 which is used, and so on are included. On the other hand, in the VHT-SIG A2 field 280, a short guard interval (SGI) 282, a FEC 284, information of a modulation and coding scheme (MCS) for a single user or the sort of the channel coding for multi-user 286, information of beamforming 287, a redundancy bits 288 for cyclic redundancy checking (CRC) and tail bits 289 of the convolutional decoder are included.

The VHT-STF 230 is the field that exists for improving the automatic gain control estimation in the MIMO environment, and the VHT-LTF 235 is the field that exists for estimating the channel in the MIMO environment. The VHT-SIG-B field 237 is the information localized in each STA, and includes the information of the length of the PSDU and that of the MCS, the tail bits, and so on.

FIG. 2(C) illustrates the VHT-SIG-A 270 and 280 which are made up of two symbols and the VHT-SIG-B field 290 which is made up of a symbol. Among these, the content of the detailed field in the VHT-SIG-A1 field 270 is included in table 22-11 fields in the VHT-SIG-A field of 22.3.8.2.3 passage of Draft STANDARD for Information Technology—

Telecommunications and information exchange between systems—Local and metropolitan area networks—Specific requirements Part 11: Wireless LAN Medium Access Control (MAC) and Physical Layer (PHY) specifications Amendment 4: Enhancements for Very High Throughput for Operation in Bands below 6 GHz.

Hereinafter, as embodiments according to the present invention, the physical (PHY) preamble structure (or the PLCP header may be used as the same meaning) for an apparatus operating in the bandwidth of 1 GHz or less (sub 1 GHz) will be described below. The present invention may be applied to an apparatus operating in the bandwidth of 1 GHz or less which is defined in the standard of IEEE 802.11ah or that of 802.11af such as the machine to machine (M2M) system. However, the contents suggested by the present invention is not limited to the M2M system, and can be widely applied to general wireless local area network (WLAN) system (or Wi-Fi network) unless it gets out of the essential features of the present invention.

The communication in the bandwidth of 1 GHz or less (sub 1 GHz) has significantly wide coverage in comparison with that of the existing WLAN which has been used indoors on propagation characteristic. The frame structure of the physical layer which is used in the bandwidth of 1 GHz or less may be simply generated by 1/10 down-clocking the frame structure which is used in the existing IEEE 802.11ac. The frame which has been used in the channel bandwidth of 20/40/80/160/80+80 MHz of IEEE 802.11ac may be used in the channel bandwidth of 2/4/8/16/8+8 MHz in the bandwidth of sub 1 GHz with being 1/10 down-clocked. As 1/10 down-clocked, the Guard Interval (GI) increases by 10 folds from 0.8 micro second to 8 micro second. Table 1 below represents the data throughput according to the channel bandwidth in case that 1/10 down-clocking is not performed and the data throughput according to the channel bandwidth in case that 1/10 down-clocking is performed.

TABLE 1

| IEEE 802.11ac PHY | | 1/10 down-clocked S1G PHY (11ah or 11af) | |
|---|---|---|---|
| CB | Throughput | CB | Throughput |
| 20 MHz | 86.7 Mbps | 2 MHz | 8.67 Mbps |
| 40 MHz | 200 Mbps | 4 MHz | 20 Mbps |
| 80 MHz | 433.3 Mbps | 8 MHz | 43.33 Mbps |
| 160 MHz | 866.7 Mbps | 16 MHz | 86.67 Mbps |
| 80 + 80 MHz | 866.6 Mbps | 8 + 8 MHz | 86.66 Mbps |

Referring to Table 1, in case of using the frame whose bandwidth is decreased by 1/10 and 1/10 down-clocking is performed, it can be seen that the data throughput is decreased by 1/10.

Hereinafter, in the embodiment according to the present invention, for the convenience of description, assuming the case that a frame is generated by 1/10 down-clocking the frame of IEEE 802.11ac. In the frame which is 1/10 down-clocked, the duration of one orthogonal frequency division multiplexing (OFDM) symbol may be 40 micro seconds which is 10 folds of 4 micro seconds, the duration of one OFDM symbol in the existing frame which is not down-clocked.

However, the method of generating PLCP preamble which is suggested by the present invention may be applied to the PLCP preamble of 802.11ac frame which is down-clocked with different ratio, not 1/10 down-clocked, and the embodiment for the frame which is down-clocked with different ratio is also included in the scope of the present invention.

Since the legacy devices which have been already operating do not exist in the bandwidth of S1G (sub 1 GHz), the PLCP preamble may be constructed without considering backward compatibility.

In order to use the existing frame in S1G bandwidth, the frame of 1/10 down-clocked the PLCP protocol data unit (PPDU) of the HT-green field format which is disclosed in 20.3.2 PLCP protocol data unit (PPDU) format of IEEE Standard for Information Technology Telecommunications and information exchange between systems Local and metropolitan area networks Specific requirements Part 11: Wireless LAN Medium Access Control (MAC) and Physical Layer (PHY) Specifications (hereinafter, IEEE 802.11) may be used.

Hereinafter, although only the case of down-clocking the HT-green field format is described for the convenience of description, the present application may be applied to the frame format described with referring to FIG. 1 and FIG. 2, and the embodiment is also included in the scope of the present invention.

Figure 3:
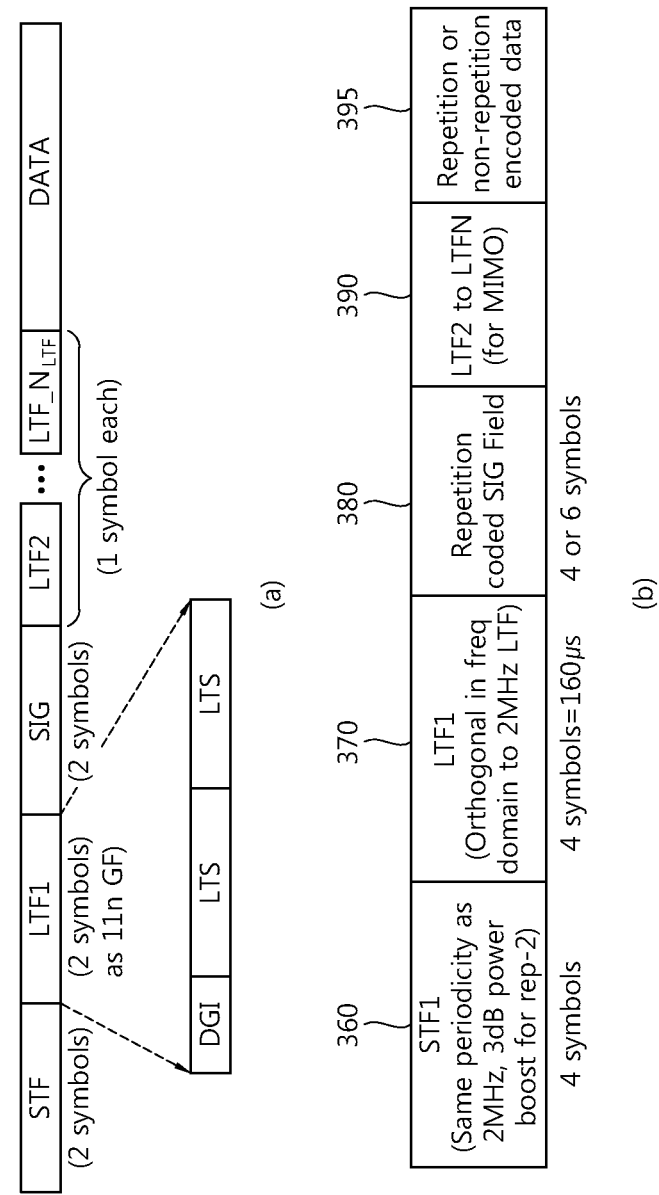
FIG. 3 is a schematic view illustrating the frame of 1/10 down-clocking the PPDU of the HT-green field format.

FIG. 3 is a schematic view illustrating the frame of 1/10 down-clocking the PPDU of the HT-green field format.

Referring to FIG. 3, the PPDU of the 1/10 down-clocked HT-green field format may include a PLCP preamble 300 and a data payload (or data field) 380. The PLCP preamble 300 may include a short training field (STF) 310, a long training field (LTF1) 320, a SIG 330 and LTF2-LTF_N 340. The definition of each field and the information included in the field are disclosed in HT-green field format preamble section of IEEE 802.11 20.3.9.5 passage. In briefly describing the object of each field, each field may have the following object.

The STF 310 may be used for performing automatic gain control estimation, timing acquisition and coarse carrier frequency offset estimation.

The LTF1 320 and LTF2-LTF_N 340 may be used for performing channel estimation and fine carrier frequency offset (CFO) estimation. The LTF having 2 OFDM symbols may include two long term symbols (LTS) 350 and 355 and a guard interval 360.

The LTF1 320 may be used for demodulating the data payload (or data field) 380 of the PPDU. The LTF2-LTF_N 340 may be used for channel estimation for each channel to which space-time stream is transmitted when using multiple input multiple output (MIMO). In case of using MIMO, in the LTF2-LTF_N 340, the number of LTF which is included in the PLCP preamble may be determined by the number of the space-time stream.

The SIG 330 may include the information for analyzing the HT packet format. For example, various information for analyzing the HT packet such as the modulation and coding scheme (MCS), the channel bandwidth, the FEC coding scheme, and so on may be included in the SIG 330.

Each of the STF 310 and the LTF1 320 may have the symbol duration of 2 OFDM symbols. In case of performing 1/10 down-clocking, the STF 310 and the LTF1 320 ahead the SIG 330 have the symbol duration that corresponds to total 160 micro second since one OFDM symbol has the duration of 40 micro second.

FIG. 3(B) is a schematic view illustrating the frame format for performing the extended range communication.

FIG. 3(B) assumes the case that the frame of the HT-green field format is transmitted in the frequency bandwidth of 1 MHz.

For example, in case of the frame being transmitted in 1 MHz, it may be transmitted with a repeated frame structure.

That is, it can be featured that the frame which is transmitted in performing communication based on the wide coverage is robust to error by transmitting repeatedly at least one field out of the STF 360, the LTF 370, the SIG field 380 and the data field 395 on the frequency axis or on the time axis.

Referring to FIG. 3(B), the OFDM symbol which is allocated to the STF 360 is allocated to 2 symbols to 4 symbols. In case that 40 micro second is allocated to one symbol after 1/10 down-clocking being performed, 4 symbols are allocated to 160 micro second.

The STF 360 may be transmitted on the same period of the case of being transmitted in 2 MHz, and the transmission power may be increased by 3 dB since it is transmitted with the repeated structure.

The OFDM symbol allocated to the LTF 370 is also increased by 2 symbols to 4 symbols. The LTF may be transmitted with being orthogonal to the frequency axis with regard to the LTF which is transmitted in 2 MHz.

The symbol which is allocated to the SIG field 380 may have a repeated structure in 2 symbols and be increased by 4 symbols to 6 symbols. In this case, although the error robustness of the PLCP preamble increases, there is a problem that the time consumed for transmitting the PLCP preamble increases by 2 fold in comparison with the existing frame format. The LTF2 to LTFN 390 and the data field 395 may also be transmitted with the repeated structure In case of WLAN, although stationary station (STA) and stationary AP are assumed, the possibility of being used in outdoor environment cannot be excluded. For example, the WLAN can be used in college campus or in outdoor parking lot. Being used in outdoor environment, the environment between the AP and the STA may be changed. Considering the Doppler Effect which can be existed in reality, the deterioration of performance may occur since there is a possibility of the change of a channel during transmitting data.

To solve the problem, considering the possibility that the transmission channel environment can be changed during transmission, the method of transmitting the data field with segmentation may be used. However, in case that all of the PLCP preamble such as the STF 360, the SIG field 380, the LTF 370 and 390 and so on are transmitted for each segmented data field, there is a drawback that the overhead due to the PLCP preamble should be taken into account. For the method of transmitting preamble according to an embodiment of the present invention, to solve the problem it is proposed to transmit the LTF additionally, which is used for demodulating the segmented data field by estimating channel in the middle of or at the end of the segmented data field. The LTF added for demodulating the segmented data field may be referred to the additionally transmitted LTF (or additional LTF).

The location of the added LTF 370 and 390 may be directly or indirectly indicated, or may be steadily used on a predefined location considering the operational environment of a user equipment. The information may be referred to the additional LTF indication information.

Hereinafter, in an embodiment of the present invention, the method of directly or indirectly indicating the location of the LTF which is added in the frame and transmitted will be described.

Figure 4:
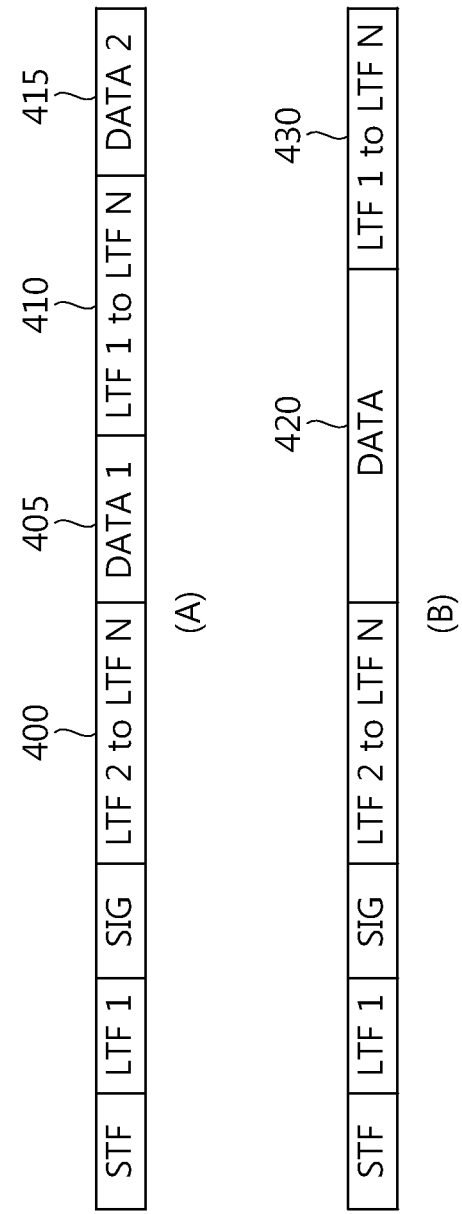
FIG. 4 is a schematic view illustrating the method of transmitting the LTF which is configured to demodulate the segmented data field according to an embodiment of the present invention.

FIG. 4 is a schematic view illustrating the method of transmitting the LTF which is configured to demodulate the segmented data field according to an embodiment of the present invention.

In FIG. 4(A), in case that the data field is multiply segmented, the method of utilizing the LTF 410 in demodulating the segmented data field 405 is described by transmitting the LTF 410 between the data fields with segmentation (segmented data field 405 and 415) and performing channel estimation. FIG. 4(A) illustrates the case that the LTF is included between the segmented data fields as an example, the data may be segmented into two or more segmented data field.

The LTF2 to LTFN 400 and the LTF1 to LTFN 410, the training fields which can be used for the channel estimation, can be used for performing channel estimation when using multiple input multiple output (MIMO). The number of the LTE which is included in the LTF 410 to be added may be changed depending on the number of the space-time stream which is used for the MIMO. The LTF which is additionally transmitted for demodulating the segmented data field such as the LTF1 to LTFN 410 may be referred to the additional LTF 410.

For example, the LTF2 to LTFN 400 may be used for the channel estimation for demodulating the first segmented data field (DATA 1) 405 transmitted, and the LTF1 to LTFN 410 may be used for the channel estimation for demodulating the second segmented data field (DATA 2) 415.

FIG. 4(B) is a schematic view illustrating the case that the additional LTF1 to LTFN 430 is transmitted following the end of the segmented data field or the data field 420. The LTF1 to LTFN 430 behind the segmented data field may be transmitted as well as the LTF1 to LTFN 430 between the segmented data fields.

Figure 5:
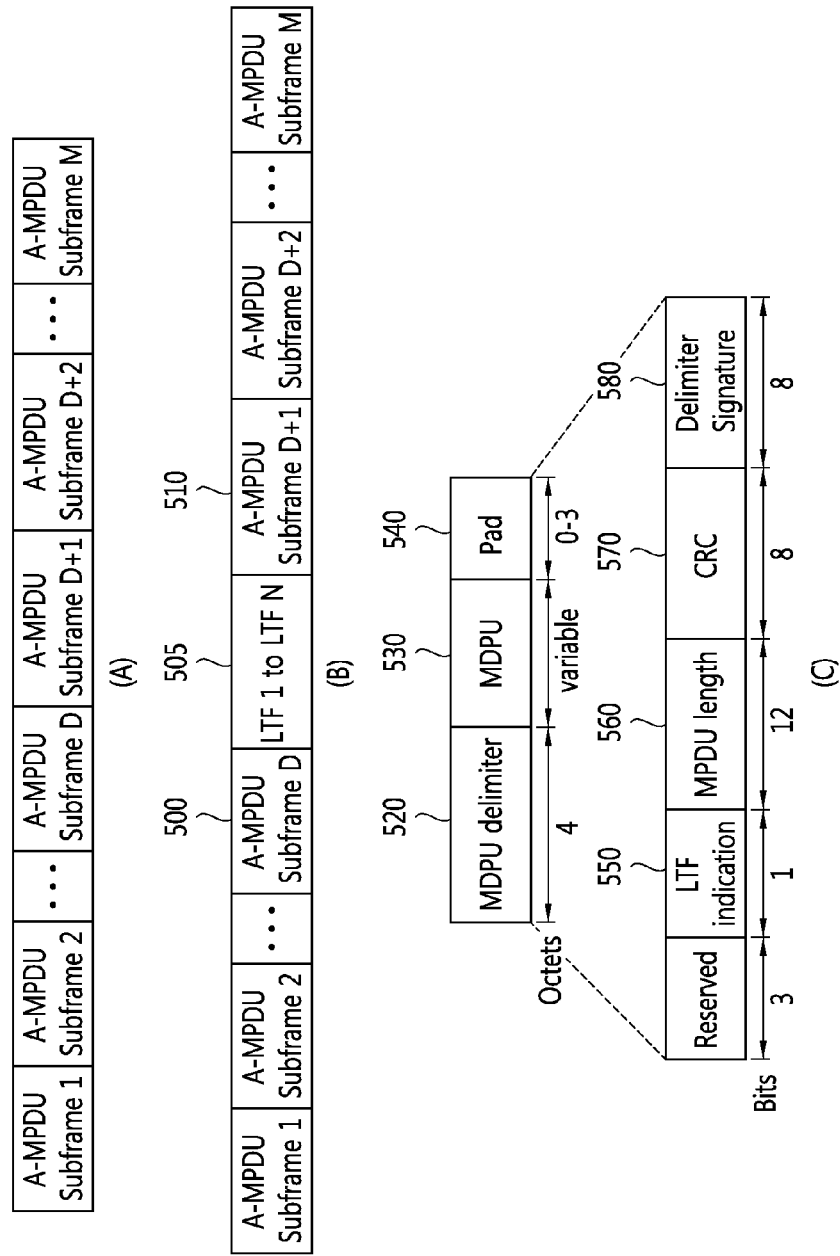
FIG. 5 is a schematic view illustrating the method of transmitting the LTF for demodulating the segmented data field according to an embodiment of the present invention.

FIG. 5 is a schematic view illustrating the method of transmitting the LTF for demodulating the segmented data field according to an embodiment of the present invention.

FIG. 5(A) illustrates the aggregated MAC protocol data unit (A-MPDU) subframe as an example of the segmented data field. One data field may be transmitted with being segmented to multiple A-MPDU subframes.

According to an embodiment of the present invention, whether the LTF exists or not at the front or the end of a specific segmented data may be indicated based on the information of the subfield which is included in the segmented data field. The information is may be referred to the information for the location of the additional LTF which is included in the frame by an additional LTF indication information.

Referring to FIG. 5(B), the case that the LTF 505 is transmitted between Dth A-MPDU subframe 500 and D+1th A-MPDU subframe 510 among the multiple A-MPDU subframes.

In this case, based on the field information which is included in the Dth A-MPDU subframe 500 or the D+1th A-MPDU subframe 510, whether the LTF 505 exists at end of the Dth A-MPDU subframe 500 may be indicated.

FIG. 5(C) is a schematic view illustrating the field information for indicating whether the LTF which is included in the A-MPDU subframe exists.

In one A-MPDU subframe, a MPDU delimiter 520, a MPDU 530 and a Pad 540 may be included. The MPDU 530 is the field that includes the information (data) to be transmitted, and the Pad 540 represents the bit padded to the A-MPDU subframe.

The MPDU delimiter 520 is the field which is used for locating the MPDU 530 within the A-MPDU subframe. In the MPDU delimiter 520, a LTF indication 550, a MPDU length 560, a CRC 570 and a delimiter signature 580 may be included.

The LTF indication 550 may be used for indicating whether the LTF is transmitted behind each of the A-MPDU subframes. For example, the A-MPDU subframe D 500, the Dth A-MPDU subframe, may set up the LTF indication 550 of its MPDU delimiter 520 to be 1 in order to indicate that the LTF is transmitted right after, and the remainder A-MPDU subframes may set up their LTF indication 550 to be 0. The LTF indication is the information indicating the location of the LTF which is additionally transmitted, may be represented as the term, the additional LTF indication information, as another term. Hereinafter, in an embodiment of the present invention, different sub field, bit information or modulation information may be additionally used for indicating the location or number of the LTF. As the term embracing the information, the additional LTF indication information may be used.

The MPDU length 560 may include the length information of octet unit of the MPDU.

The CRC 570 includes the CRC information of 8 bits with regard to 16 bits ahead.

The delimiter signature 580 may be used for searching the MPDU delimiter 520 in case of performing scanning for the delimiter.

That is, according to an embodiment of the present invention, whether the LTF is transmitted at the front or the end of the segmented data field may be indicated based on the sub field information which exists in the segmented data field.

Figure 6:
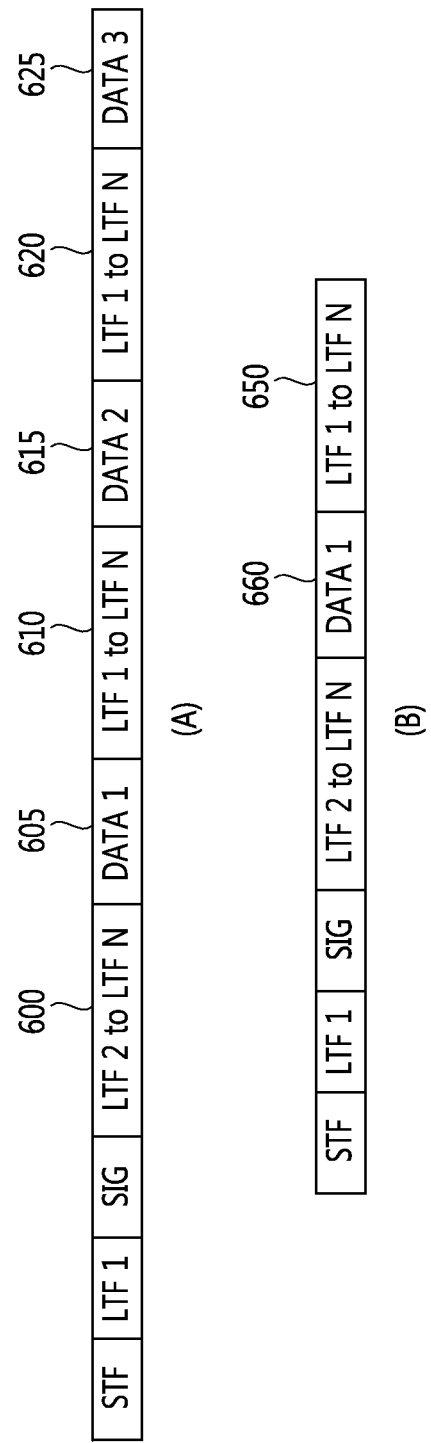
FIG. 6 is a schematic view illustrating the method of transmitting the LTF which is configured to demodulate the segmented data field according to an embodiment of the present invention.

FIG. 6 is a schematic view illustrating the method of transmitting the LTF which is configured to demodulate the segmented data field according to an embodiment of the present invention.

FIG. 6(A) may illustrate that the LTF 600, 610 and 620 which is additionally transmitted at the end is transmitted based on the sub field information which is included in each of the segmented data fields with regard to the segmented data field 605, 615 and 620 which is segmented into 3.

For example, it may indicate that the first LTF 610 may be transmitted after the first segmented data field 605 by setting up the LTF indication which is included in the first segmented data field 605 to 1. In addition, it may indicate that the LTF 620 may be transmitted after the second data field 615 by also setting up the LTF indication 620 of the second segmented data field 615 which is transmitted after the first LTF 610 to 1.

FIG. 6(A) represents that case that the LTF 600, 610 and 620 are transmitted, which is to demodulate the segmented data field for each segmented data field. However, it does not necessarily mean that the LTF 600, 610 and 620 should be separately transmitted for each segmented data field. For example, it is possible to transmit the LTF by determining a predetermined period (for example, one LTF for every two segmented data fields) or to adjust the number of the LTF to be transmitted considering the channel state.

FIG. 6(B) is a schematic view illustrating the case that the LTF 650 is transmitted behind the data field or the segmented data field 660.

Referring to FIG. 6(B), the LTF 650 is transmitted behind the data field or the segmented data field 660, and it is possible that the LTF 650 is used as the channel estimation information for demodulating the data field or the segmented data field 660 transmitted ahead of it.

Figure 7:
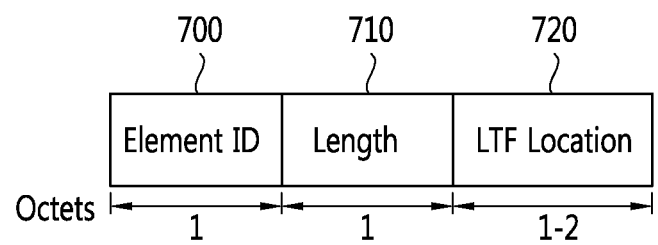
FIG. 7 is a schematic view illustrating the frame structure for performing the method of indicating the location of the LTF for demodulating the segmented data field according to an embodiment of the present invention.

FIG. 7 is a schematic view illustrating the frame structure for performing the method of indicating the location of the LTF for demodulating the segmented data field according to an embodiment of the present invention.

In FIG. 7, as a method for indicating the location of the LTF which is added, the LTF may be transmitted after a predetermined number of the OFDM symbol within a predetermined frame by including the information for indicating the location of the LTF in the frame which is transmitted from the AP or the STA.

Hereinafter, in an embodiment of the present invention, the case is assumed and described that the location of the LTF on the OFDM symbol of the frame which is transmitted from the AP is predetermined and transmitted. For example, the LTF location information which is determined from the AP may be forwarded to the STA through the probe response frame which is the management frame transmitted in the process of scanning with the STA or through the association response frame which is the frame transmitted in the coupling process. In case that the STA performs the passive scanning, it is possible to be transmitted with being included in the beacon frame.

That is, in the method of transmitting the segmented data field according to an embodiment of the present invention, the location information of the LTF may be transmitted from the frame by transmitting the information element included in the frame body of the frame which is transmitted from the AP to the STA with the LTF location element which is a new information element.

Referring to FIG. 7, the LTF location element which is included in the frame body of the management frame may include an element ID 700, a length 710 and a LTF location 720.

The element ID 700 is the value for indicating what is the information element included in the frame body, and may include the indication information which is used for indicating that the current data is the LTF location element. The length 710 may include the bit number information which is allocated to the LTF location 720.

In the LTF location 720, the information of the number of the OFDM symbol for indicating how many OFDM symbols have been transmitted before the LTF is transmitted or that of the Time duration where the LTF transmission begins may be included. For example, the information for the LTF being transmitted at nth OFDM symbol after the segmented data field begins may be included in the LTF location 720, or the information of the location of the OFDM symbol where the LTF is allocated (from A OFDM symbol to A+a OFDM symbol) may be included in the LTF location 720 as the allocation information of the LTF.

According to an embodiment of the present invention, the LTF location information may be included in the frame which is used for transmitting and receiving the data after being coupled as well as included in the management frame which is used for scanning, authentication and coupling process. That is, in case that the information of the OFDM location which is allocated to the LTF is transmitted from another frame, the location of the LTF may be changed. That is, the transmission location of the LTF in a frame may be changed after the LTF location information changed is transmitted.

Figure 8:
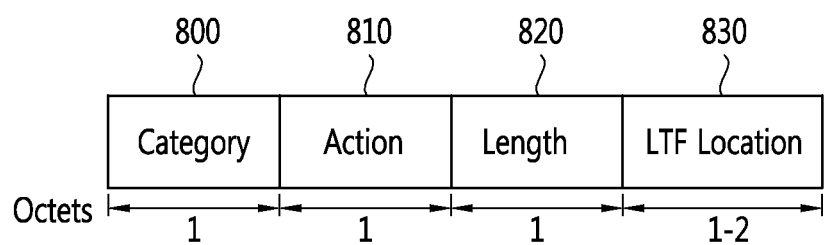
FIG. 8 is a schematic view illustrating the frame structure which is configured to perform the method of indicating the location of the LTF according to an embodiment of the present invention.

FIG. 8 is a schematic view illustrating the frame structure which is configured to perform the method of indicating the location of the LTF according to an embodiment of the present invention.

In FIG. 8, the separate management frame for indicating the location of the LTF which is additionally transmitted from the segmented data field may be defined.

For example, the information of the OFDM symbol where the LTF is transmitted may be transmitted to the STA as the AP transmitting the LTF Location management frame where the LTF location information is included to the STA.

The LTF Location management frame may include a category 800, an action 810, a length 820 and a LTF location 830. The category 800 may indicate which category is the LTF Location management frame which is belonging to on a classification of the frame. The action 810 may be used as the information of indicating that the current frame is the LTF Location management frame based on the frame which is classified through the category 800. In addition, the length 820 may be the bit number information which is allocated to the LTF location 830.

In the LTF location 830, there are the information of the number of the OFDM symbol for indicating how many OFDM symbols have been transmitted within the frame before the LTF which is additionally transmitted or that of the time duration where the LTF transmission begins. For example, that the LTF is transmitted at how many OFDM symbols from the OFDM symbol where the segmented data field is transmitted may be included in the LTF location 830, or the information for the location of the OFDM symbol (from A OFDM symbol to A+a OFDM symbol) to which the LTF is allocated may be included in the LTF location 830.

In the method of indicating the LTF location which is configured to demodulate the segmented data field according to an embodiment of the present invention, in order to indicate the LTF location which is added, the number or the location of the LTF which is included in the data field within the SIG field of the PLCP preamble may be indicated.

In order to indicate that the number of the LTF in the SIG field, at least one bit information which is included in the SIG field may be used. For example, in case that the number of the LTF is indicated in the SIG field through 1 bit, the number and the location of the LTF which is mapped to the value of the SIG field may have the values, for example, as shown in Table 2.

TABLE 2

| Subfield value | Meaning |
| --- | --- |
| 0 | No LTF in PSDU |
| 1 | One set of LTF 1 to LTF N in PSDU after L OFDM symbols, where L is ceil(Num_sym/2) or floor(Num_sym/2). *ceil(x) is an integer equal to or larger than x. *floor(x) is an integer equal to or smaller than x. |

Referring to Table 2, the number and the location of the LTF may be represented with the bit value of 1 bit which is allocated to indicate the number and the location of the LTF.

For example, in case that the value of the SIG field is 0, it may indicate that additional LTF for demodulating the data field (PSDU) is not transmitted. In case that the value of the SIG field is 1, it is represented that the LTF field is included in the symbol location that corresponds to as much as the value of ceil (Num_sym/2) or floor (Num_sym/2) based on the Num_sym (which means the number of the OFDM symbol in the PSDU). The Ceil(x) may be used as the function for calculating the integer of x value or more, and the floor(x) may be used as the function for calculating the integer of x value or less.

Table 2 represents whether the LTF exists in the data field based on one bit, and represent as an example the location of the LTF in case of existing. The value of the SIG field, and the location and the number of the LTF associated to the corresponding field may have different values.

Table 3 below is a table representing whether the LTF exists and representing the location of the LTF in case of existing using two bits.

TABLE 3

| Subfield value | Meaning |
| --- | --- |
| 00 | No LTF in PSDU |
| 01 | One set of LTF 1 to LTF N in PSDU after L OFDM symbols, where L is ceil(Num_sym/2) or floor(Num_sym/2). *ceil(x) is an integer equal to or larger than x. *floor(x) is an integer equal to or smaller than x. |
| 10 | Two sets of LTF 1 to LTF N in PSDU. i-th set is located after L_i OFDM symbols, where L_i is ceil(Num_sym*i/3) or floor(Num_sym*i/3), for i = 1, 2. |
| 11 | Three sets of LTF 1 to LTF N are located in PSDU. i-th set is located after L_i OFDM symbols 3, where L_i is ceil(Num_sym*i/4) or floor(Num_sym*i/4), for i = 1, 2, 3. |

Figure 9:
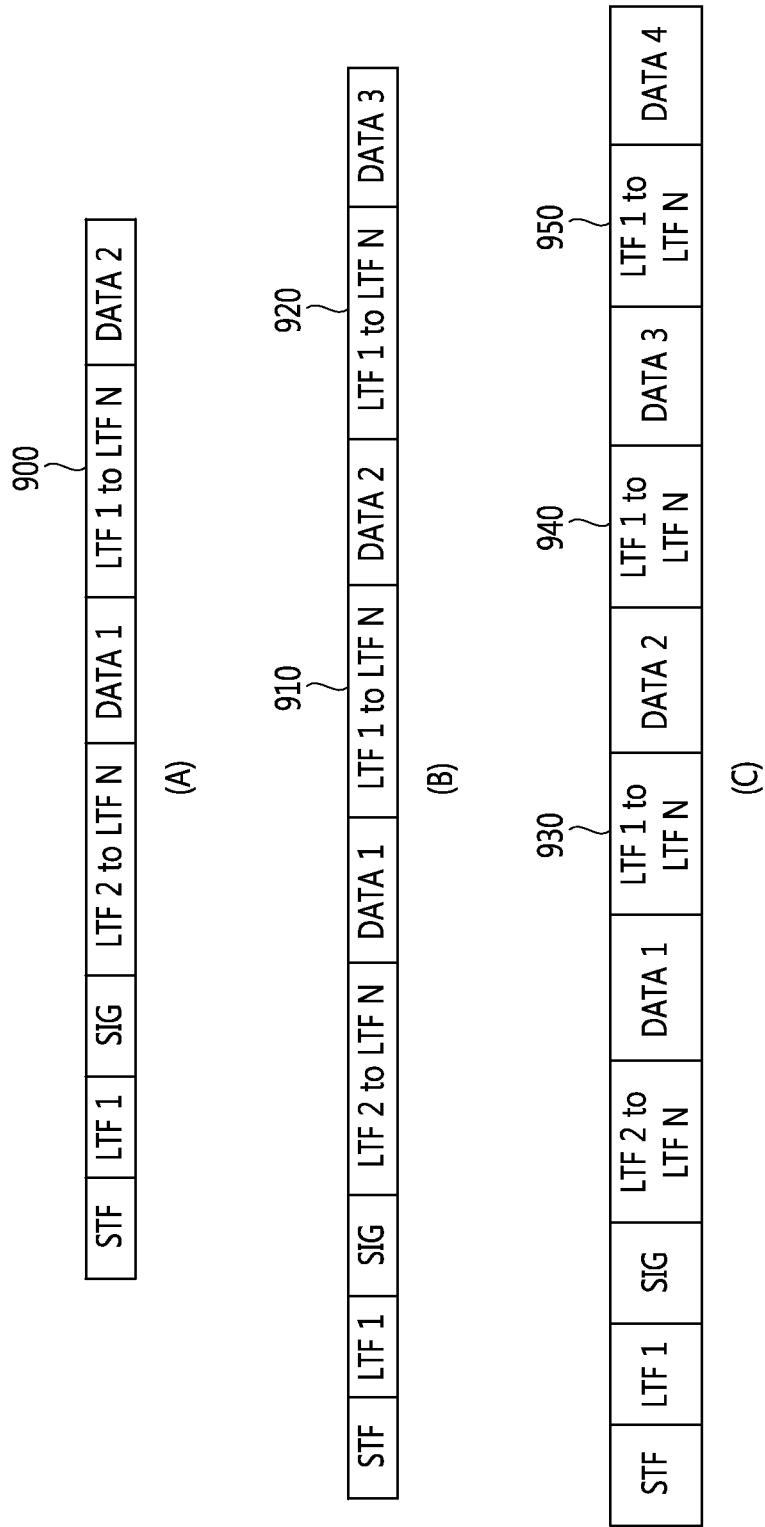
FIG. 9 is a schematic view illustrating the location and the number where the LTF is included according to the SIG field in an embodiment of the present invention.

FIG. 9 is a schematic view illustrating the location and the number where the LTF is included according to the SIG field in an embodiment of the present invention.

Referring to Table 3, in case that the value of the SIG field is '00', the information that the LTF is not included in the data field may be included.

FIG. 9(A) represents the case that a LTF set 900 is included for demodulating segmented data field, in case that the value of the SIG field is '01'. The location of the LTF 900 indicates that the LTF field is included in the symbol location that corresponds to the value of ceil (Num_sym/2) or floor (Num_sym/2) with a variable of Num_sym (which means the number of the OFDM symbol in the PSDU).

In case that the value of the SIG field is '10', it is represented that two set of LTF 910 and 920 are used for demodulating the segmented data field. The symbol of the LTF may be located to the location that corresponds to ceil (Num_sym*i/3) or floor (Num_sym*i/3) in response to the case that i is 1 and 2, based on the Num_sym.

In case that the value of the SIG field is '11', three sets of LTF 930, 940 and 950 can be used for demodulating the segmented data field. The symbol of the LTF may be located to the location that corresponds to ceil (Num_sym*i/4) or floor (Num_sym*i/4) in response to the case that i is 1, 2 and 3, based on the Num_sym.

The method of indicating the location of the LTF which is included in the data field using the bit information in the SIG field is various, as shown in Table 4 and Table 5 below, different methods may be used.

Table 4 is a table for representing the number and the location of the LTF in the data field using one bit which is included in the SIG field.

TABLE 4

| Subfield value | Meaning |
| --- | --- |
| 0 | No LTF in PSDU |
| 1 | LTFs are located every 10 ms (or 250 OFDM symbols) |

Referring to Table 4, in case that the value of the SIG field is 0, it may be represented that the LTF for demodulating the segmented data field is not additionally transmitted.

In case that the value of the SIG field is 1, the LTF may be indicated based on a specific period, for example, 10 ms period (or 250 OFDM symbol periods). The period may be the information which is predetermined or changed depending on different field information. That is, Table 3 is an example of the table using the information of 1 bit in order to indicate whether the LTE is not transmitted in the data field or whether the LTF is transmitted in the data field using a predetermined period.

Table 5 is a schematic view illustrating the location of the LTF which is additionally transmitted for demodulating the segmented data field using two bits included in the SIG field.

TABLE 5

| Subfield value | Meaning |
|---|---|
| 00 | No LTF in PSDU |
| 01 | LTFs are located every 10 ms (or 250 OFDM symbols) |
| 10 | LTFs are located every 5 ms (or 125 OFDM symbols) |
| 11 | LTFs are located every 2 ms (or 50 OFDM symbols) |

Referring to Table 5, in case that the bit included in the SIG field is '00', it may be indicated that the LTF for demodulating the segmented data field is not transmitted.

In case that the bit included in the SIG field is '01', it may be indicated that the LTF may be transmitted based on the period of 10 ms (or 250 OFDM symbol periods).

In case that the bit included in the SIG field is '10', it may be indicated that the LTF may be transmitted based on the period of 5 ms (or 125 OFDM symbol periods).

In case that the bit included in the SIG field is '11', it may be indicated that the LTF may be transmitted based on the period of 2 ms (or 50 OFDM symbol periods).

That is, the information of whether the LTF is transmitted in the data field and the period information that the LTF is transmitted in the segmented data field may be transmitted based on two bits.

Figure 10:
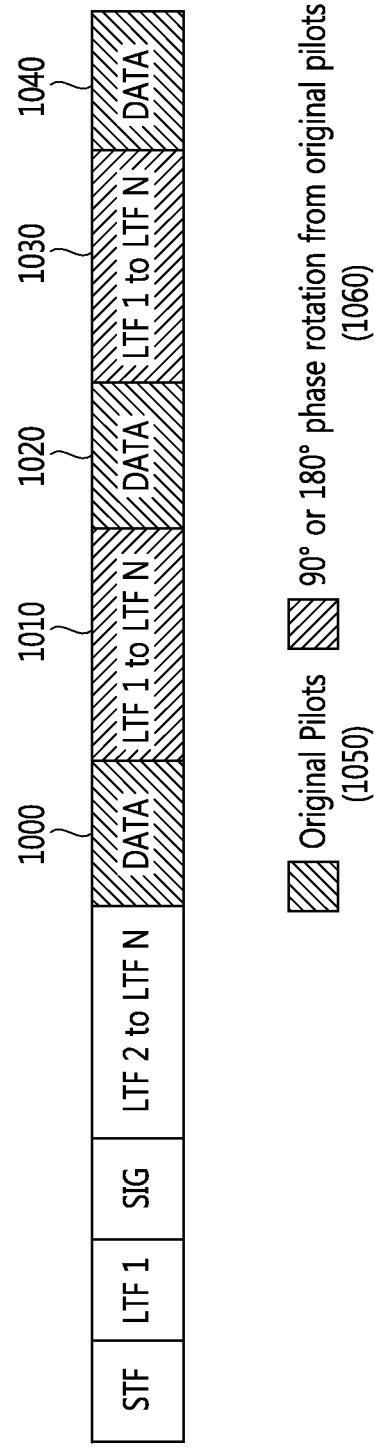
FIG. 10 is a schematic view illustrating the method of indicating the LTF which is configured to demodulate the segmented data field according to an embodiment of the present invention.

FIG. 10 is a schematic view illustrating the method of indicating the LTF which is configured to demodulate the segmented data field according to an embodiment of the present invention.

In FIG. 10, the method of distinguishing the segmented data field and the LTF by rotating phase of the pilot signal which is included in the PSDU.

For example, the segmented data fields 1000, 1020 and 1040 and the LTFs 1010 and 1030 may be transmitted with the pilot signal being included on the location of a specific sub-carrier on the frequency axis. According to an embodiment of the present invention, the information whether the currently transmitted fields are the segmented data fields 1000, 1020 and 1040 or the LTFs 1010 and 1030 by using the pilot signal may be transmitted with being included.

As the pilot signal included in the segmented data fields 1000, 1020 and 1040, the pilot signal which is identical to the existing pilot signal (original pilots) 1050 may be used, and as the pilot signal included in the LTFs 1010 and 1030, the pilot signal of 90 or 180 degrees phase rotated from the existing pilot signal (90 or 180 phase rotation from original pilots) 1060 may be used. The STA that receives the frame including the field having different pilot phase may distinguish whether the current field is the segmented data field or the LTF based on the phase difference between the segmented data field and the pilot signal.

Figure 11:
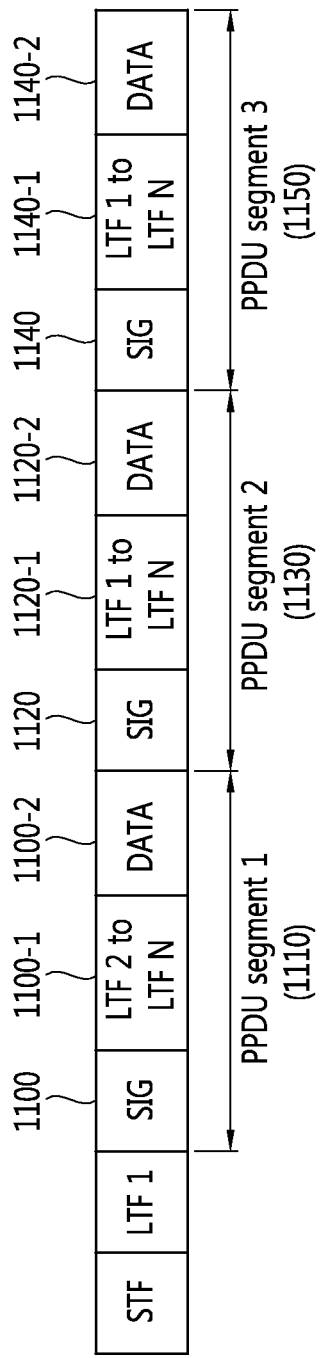
FIG. 11 is a schematic view illustrating the method of indicating the location of the LTE which is configured to demodulate the segmented data field according to an embodiment of the present invention.

FIG. 11 is a schematic view illustrating the method of indicating the location of the LTE which is configured to demodulate the segmented data field according to an embodiment of the present invention.

In FIG. 11, the method of using the SIG fields 1100, 1120 and 1140 for indicating the location of the LTF which is added will be described. The frame may be generated additionally including the SIG field 1100, 1120 and 1140 and the LTF in the front part of each segmented data field for the case that the segmented data fields 1100-2, 1120-2 and 1140-2 are transmitted It shows the same form to the first segmented data field but the SIG 1100, 1120 and 1140 and the LTF 1100-1, 1120-1 and 1140-1 may be located in the front part of each segmented data field from the second segmented data field. It is indicated by using the term as data segment unit 1110, 1130 and 1150 for a unit which is including the SIG 1100, 1120 and 1140 and the LTF 1100-1, 1120-1 and 1140-1 and the segmented data field 1100-2, 1120-2 and 1140-2.

The information of the length (the number of bit) of the data field which is included in the data segment unit may be included in the SIG fields 1100, 1120 and 1140 which is transmitted from the front part of the PPDU segment 1110, 1130 and 1150. The length information of the data field may be represented using the number of byte of each segmented data field 1100-2, 1120-2 and 1140-2, the information of the time duration, or the number of the OFDM symbols. For example, in the SIG field 1100 which is included in the first data segment unit 1110, the length information of the data field 1100-2 which is included in the first data segment unit 1110 may be included. Also, in the SIG 1120 of the data field 1120-2 which is included in the second data segment unit 1130, the information of the length of the data field 1120-2 which is included in the second data segment unit 1130 may be included.

According to an embodiment of this invention, the sub field within the SIG field which is included in each data segment unit may be differently configured. For example, the MCS information which is included in the SIG field 1100 of the first data segment unit 1110 may have a different value from the MCS information which is included in the SIG field 1120 of the second data segment unit 1130. Also, the SIG field 1100 of the first data segment unit 1110 contains the information of the frequency bandwidth but the SIG field 1120 of the second data segment unit 1130 may not contain the information of the frequency bandwidth.

FIG. 12 is a schematic view illustrating the method of indicating whether the LTF is additionally included in the data field according to an embodiment of the present invention.

FIG. 12 illustrates the frame added the sub field which indicates whether the LTF is additionally transmitted FIG. 12(A) illustrates the frame added the sub field which indicates whether the LTF is additionally transmitted in addition to the SIG field in the segmented data field. For example, it is able to transmit the SIG field 1200 added the sub field named the additional LTF 1220.

If the value of the additional LTF 1220 is 1, the information may be indicated that the additional LTF for decoding the segmented data field is included and transmitted. If the value of the additional LTF 1220 is 0, the information may be indicated that the additional LTF for decoding the segmented data field is not included but transmitted.

As another embodiment, FIG. 12(B) shows that the SIG field 1250 and 1270 may be transmitted with different messages being included by performing the phase rotation of the SIG field 1250 and 1270 differently. For example, by selectively use one of the modulation methods, the quadrature binary phase shift keying (QBPSK) and binary phase shift keying (BPSK) for the whole or a part of the SIG field, the additional LTF may be transmitted containing implicitly whether the LTF is included in the data field according to the modulation method.

SIG field 1250, 1250-1, 1270 and 1270-1 may be divided into the SIG 1 field 1250 and 1270 and the SIG 2 field 1250-1 and 1270-1 according to the information which is included in the field. For example, In case of performing the modulation for the SIG 1 field 1250 and 1270 among SIG fields by using QBPSK, it is indicated that the LTF is not additionally transmitted. On the contrary, in case of performing the modulation for the SIG 1 field 1270, it is indicated that the LTF for demodulating the segmented data field is additionally transmitted.

By using this method, the information of whether the additional LTF is transmitted to the data field can be gained in decoding the SIG field. The method described in FIG. 12 can be used together with the method of transmitting including the location information of the LTF in the segmented data field.

According to an embodiment of the present invention, the LTF length which is transmitted in order to demodulate the segmented data field may be changeable.

For example, the modulation coding scheme (MCS) for modulating or coding the data according to the channel condition may be changed. MCS is transmitted being included in the SIG field of the PLCP preamble. According to an embodiment of the present invention, unnecessary waste of resource may be reduced by transmitting with letting the length of the LTF changed variably which is transmitted on the time domain based on the MCS information included in the SIG field.

The MCS value within the SIG field may be decided depending on the channel conditions and transmitted as follows: in case that the channel condition is good, it is decided with the high MCS index value and in case that the channel condition is not good, it is decided with the low MCS index value.

In case that the MCS value is bigger than or the same with the MCS which is the lowest MCS, the standard for transmitting the frame without any repetition based on the MCS index value, repetition is not applied to all of the LTF which is additionally transmitted and the segmented data field. In this time, the LTFs which are additionally transmitted may be transmitted with each being allocated to the length of 1 OFDM symbol.

In case the MCS index value within the SIG field is the value which is less than the lowest MCS without repetition, the OFDM symbol may be transmitted by repeatedly being generating on the time axis or on the frequency axis. In this case, all of the LTF which is additionally transmitted and the segmented data field may be transmitted with being generated in the repeated structure. In case of the MIMO transmission, the length of OFDM symbol may be increased twice approximately by repetition each of the LTFs (the LTF which is additionally transmitted) which is transmitted for demodulating the segmented data field. Hereinafter, the method for changing variably the resource which is allocated to the LTF having this kind of structure will be described.

Figure 13:
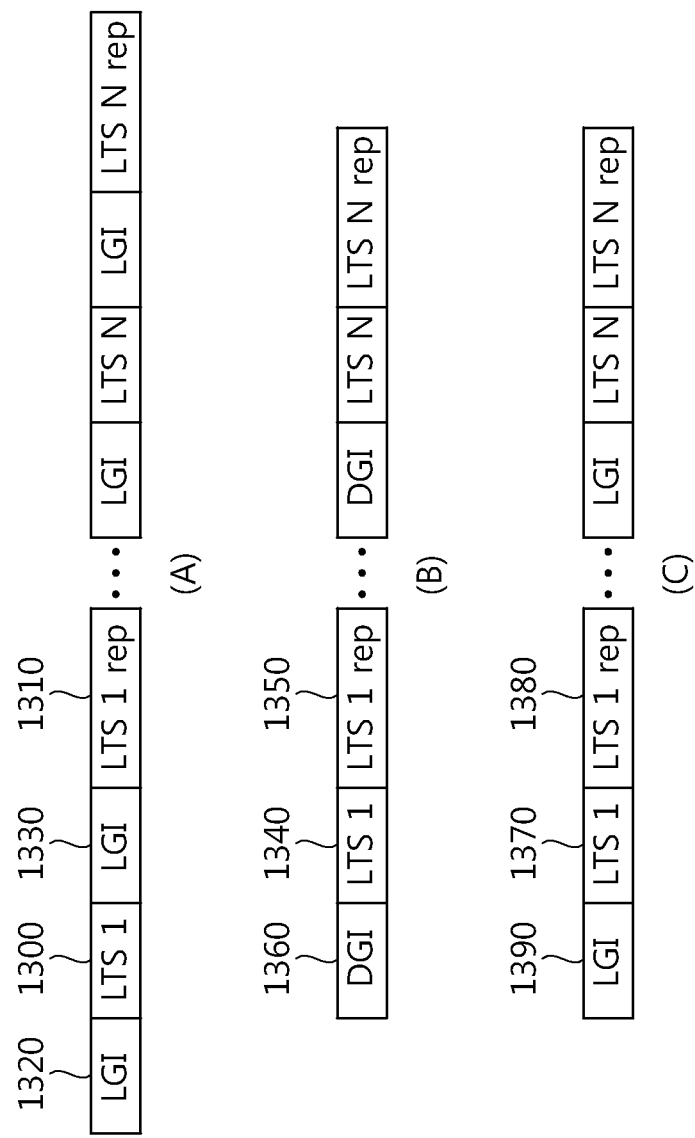
FIG. 13 is a schematic view illustrating the LTF according to an embodiment of the present invention.

FIG. 13 is a schematic view illustrating the LTF according to an embodiment of the present invention.

In FIG. 13(A), the LTF of repeated structure may have the structure which includes the LGI 1320 and 1330 in the front part for the repeated long training symbol (LTS) 1300 and 1310 and each individual LTS 1300 and 1310.

Each of the LTFs may be transmitted inserting the long training symbol 1320 and 1330 as a cyclic prefix (CP) at each front part of the long training symbol (LTS) 1300 which is converted to the time domain and the repetition LTS 1310, a repeated structure. In case that the LTF to be additionally transmitted is included in this way, the symbol length allocated to the LTF gets increased as twice as compared with the LTF which doesn't have an existing repeated structure.

FIG. 13(B) is a schematic view illustrating the case that the double guard interval (DGI) 1360 is included as a CP at the front part of LTS 1340 and 1350 of repeated structure.

In order to generate the DGI 1360, the part from the end of LTS1rep 1350 to the length of the DGI is copied and inserted. The DGI 1360 is the CP which has the structure that the LGI is repeated twice. In case of using the method of FIG. 13(A), it has the same length with the length of the OFDM symbol which is allocated to the LTF on the time axis. In case of using the method of FIG. 13(B), the time domain waveform which goes on from DGI 1360, LTS1 1340 to LTSNrep 1350 has an advantage that has a continuous waveform without any discontinuity differently from the FIG. 13(A). In case of FIG. 13(A), there may be possibility to occur a discontinuous point between the LTSrep 1310 and the following LGI.

FIG. 13(C) shows the case that the LGI 1390 is used instead of the DGI 1360 of the FIG. 13(B). In case of using the way of the FIG. 13(C), the length of the symbol gets shorter as much as that of LGI compared with FIG. 13(A) and FIG. (B).

For example, it is assumed that the lowest MCS level to transmit without any repetition is MCS1 and that the highest MCS level is MCS8. In case that the MCS level is 0, the OFDM symbol generated as MCS1 is transmitted on the time axis or on the frequency axis by repetition.

For example, if there is a frame which is transmitted through the frequency bandwidth of 1 MHz, until the fields of STF, LTF1 and SIG which is transmitted from the PLCP preamble of the frame, the PLCP is transmitted in the repeated structure which is the way of transmission used in the case that the MCS is always 0 regardless of the current channel condition. The MCS level information is indicated based on the value of the MCS sub field within the SIG field and the LTF which is additionally transmitted in order to demodulate the segmented data field may decide whether any repetition is made or not based on the MCS index value transmitted from the SIG filed. For example, in case that the MCS which is transmitted from the SIG field is 0, the LTF which is additionally transmitted may decide whether it is transmitted in any form of repeated structure.

For example, it is available to be set to transmit the LTF of a repeated structure by selecting one among (A), (B) and (C) of the FIG. 13 previously described. One of the repeated structures in FIG. 13 is predetermined and used, and according to MCS, one of repeated structures of LTF among (A), (B) and (C) in FIG. 13 may be selected and used.

FIG. 14 is a schematic view illustrating the LTF according to an embodiment of the present invention.

FIG. 14 is a schematic view illustrating the structure that one LTS is transmitted.

Referring to FIG. 14(A), the LTF may use the structure including the long guard interval (LGI) 1400 as a cyclic prefix (CP) in the time domain or use the structure including the short guard interval (SGI) 1410 as a cyclic prefix (CP) in the time domain.

FIG. 14(B) is a schematic view illustrating the structure that the plural numbers of LTS are transmitted.

Referring to FIG. 14(B), the LTF may be transmitted in the repeated structure and may contain the LGI 1420 and 1420-1 or SGI 1430 and 1430-1 at the front part of the repeated LTS. The LTF may use the structure including the long guard interval (LGI) 1420 as a cyclic prefix (CP) of each LTS in the time domain or use the structure including the short guard interval (SGI) 1430 and 1430-1 as a cyclic prefix (CP) of each LTF in the time domain.

FIG. 14(C) is a schematic view illustrating the case that the plural numbers of LGI and SGI is included at the front part of the LTF in the form of double guard interval (DGI). The DGI 1440 and 1450 may have the structure that the LGI is repeated twice or the structure that the SGI is repeated twice. Referring to the FIG. 14(C), the LTF may be generated using the way of locating the plural numbers of LGI 1440 or SGI 1450 at the front part of the repeated LTS.

Figure 15:
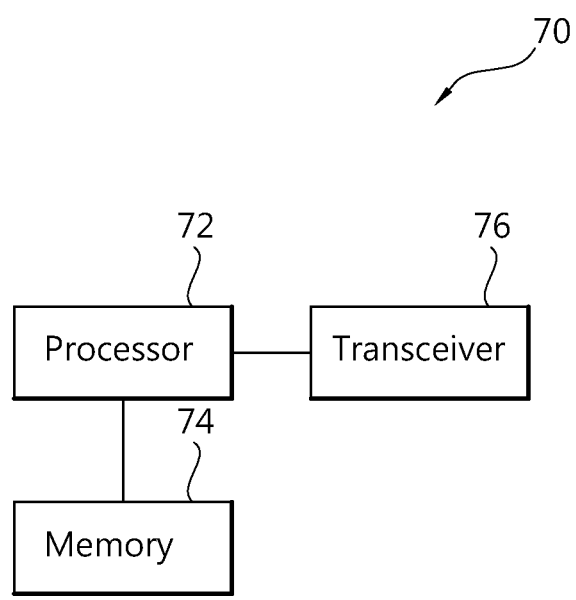
FIG. 15 is a block diagram illustrating the wireless apparatus that an embodiment of the present invention can be implemented.

FIG. 15 is a block diagram illustrating the wireless apparatus that an embodiment of the present invention can be implemented.

The wireless apparatus 70 is the user equipment that the above described embodiment can be implemented, may be an AP or non-AP station (STA).

The wireless apparatus 70 includes a processor 72, a memory 74 and a transceiver 76. The transceiver 76 receives/transmits a radio signal, where the physical layer of IEEE 802.11 is implemented. The processer 2 may implement the method of transmitting the training field in a wireless LAN system according to an embodiment of the present invention. For example, the processor may be implemented to transmit the additional long training field (LTF) indication information and to transmit the frame including the additional LTF and the segmented data field. That is, the processor 72 may be implemented to pursuit the embodiments of the present invention described above.

The processor 72 and/or the transceiver 76 may include an application-specific integrated circuit (ASIC), a separate chipset, a logic circuit, and/or a data processing unit. The memory 74 may include a read-only memory (ROM), a random access memory (RAM), a flash memory, a memory card, storage medium, and/or other equivalent storage devices. When the embodiment of the present invention is implemented in software, the aforementioned methods can be implemented with a module (i.e., process, function, etc.) for performing the aforementioned functions. The module may be stored in the memory 74 and may be performed by the processor 72. The memory 74 may be located inside or outside the processor 72, and may be coupled to the processor 72 by using various well-known means.

What is claimed is:

1. A method for transmitting a training field in a wireless Local Area Network (LAN) system, the method comprising:
   generating a physical (PHY) protocol data unit (PPDU); and
   transmitting the PPDU,
   wherein the PPDU includes a first group of at least one long training field (LTF), a first data segment unit, a second group of at least one LTF and a second data segment unit,
   wherein the first group of at least one LTF is followed by the first data segment unit,
   wherein the first data segment unit is followed by the second group of at least one LTF,
   wherein the second group of at least one LTF is followed by the second data segment unit,
   wherein the second group of at least one LTF includes at least one additional LTF,
   wherein the first group of at least one LTF is used for decoding of the first data segment unit,
   wherein the second group of at least one LTF is used for decoding of the second data segment unit,
   wherein PPDU further includes additional LTF indication information to indicate that the at least one additional LTF is included in the PPDU,
   wherein the additional LTF indication information is included in a signal (SIG) field in the PPDU, and
   wherein the additional LTF indication information indicate that the at least one additional LTF is included in the PPDU based on a modulation method for the SIG field.

2. The method of claim 1,
   wherein the additional LTF indication information further includes information related to a number of at least one group of at least one LTF including at least one additional LTF.

3. The method of claim 1,
   wherein the additional LTF indication information further includes information related to an Orthogonal Frequency Division Multiplexing (OFDM) symbol where the second group of at least one LTF is initiated in the PPDU.

4. The method of claim 1, wherein the second data segment units includes a first pilot signal,
   wherein the second group of at least one LTF includes a second pilot, and
   wherein a phase of the second pilot signal is rotated based on a phase of the first pilot signal.

5. The method of claim 1,
   wherein the second group of at least one LTF is transmitted on a Orthogonal Frequency Division Multiplexing (OFDM) symbol including a long guard interval (LGI), a short guard interval (SGI) or a double guard interval, and
   wherein a type of guard interval is determined among the LGI, the SGI and the double guard interval based on a modulation and coding scheme (MCS) index used in the PPDU.

6. A user equipment that transmit a training field in a wireless Local Area Network (LAN) system, the user equipment comprising:
   a radio frequency unit configured to transmit or receive a radio signal; and
   a processor configured to:
   generate a physical (PHY) protocol data unit (PPDU); and
   transmit the PPDU,
   wherein the PPDU includes a first group of at least one long training field (LTF), a first data segment unit, a second group of at least one LTF and a second data segment unit,
   wherein the first group of at least one LTF is followed by the first data segment unit,
   wherein the first data segment unit is followed by the second group of at least one LTF,
   wherein the second group of at least on LTF is followed by the second data segment unit,
   wherein the second group of at least on LTF includes at least one additional LTF,
   wherein the first group of at least one LTF used for decoding of the first data segment unit,
   wherein the second group of at least on LTF is used for decoding of the second data segment unit,
   wherein PPDU further includes additional LTF indication information to indicate that the at least one additional LTF is included in the PPDU,
   wherein the additional LTF indication information is included in signal (SIG) field in PPDU, and
   wherein the additional LTF indication information indicate that the at least one additional LTF is included in the PPDU based on a modulation method for the SIG field.

7. The user equipment of claim 6,
   wherein the additional LTF indication information further includes information related to a number of at least one group of at least one LTF including at least one additional LTF.

8. The user equipment of claim 6,
   wherein the additional LTF indication information further includes information related to an Orthogonal Frequency Division Multiplexing (OFDM) symbol where the second group of at least one LTF is initiated in the PPDU.

9. The user equipment of claim 6,
wherein the second data segment units includes a first pilot signal,
wherein the second group of at least one LTF includes a second pilot signal, and
wherein a phase of the second pilot signal is rotated based on a phase of the first pilot signal.

10. The user equipment of claim 6,
wherein the second group of at least one LTF is transmitted on a Orthogonal Frequency Division Multiplexing (OFDM) symbol including a long guard interval (LGI), a short guard interval (SGI) or a double guard interval, and
wherein a type of guard interval is determined among the LGI, the SGI and the double guard interval based on a modulation and coding scheme (MCS) index used in the PPDU.

* * * * *